United States Patent [19]

Branick

[11] 3,944,458
[45] Mar. 16, 1976

[54] TIRE STITCHING APPARATUS

[76] Inventor: Charles Earl Branick, 1601 S. 9th St., Fargo, N. Dak. 58102

[22] Filed: May 20, 1974

[21] Appl. No.: 471,321

[52] U.S. Cl............. 156/412; 156/128 R; 156/413; 156/421
[51] Int. Cl.²........................................ B29H 17/02
[58] Field of Search .......... 156/412, 413, 421, 405, 156/130, 406, 128 R, 129

[56] References Cited
UNITED STATES PATENTS

| | | | |
|---|---|---|---|
| 1,300,341 | 4/1919 | Butler | 156/413 |
| 1,888,356 | 11/1932 | Mayne | 156/412 |
| 2,544,390 | 3/1951 | Mallory | 156/412 |
| 3,057,397 | 10/1962 | Riddle et al. | 156/412 |
| 3,162,563 | 12/1964 | Roesch | 156/411 |
| 3,535,188 | 10/1970 | Mallory et al. | 156/412 |
| 3,556,902 | 1/1971 | Cole | 156/412 |
| 3,819,449 | 6/1974 | Caretta | 156/413 |

Primary Examiner—Douglas J. Drummond
Assistant Examiner—John E. Kittle

[57] ABSTRACT

An apparatus for applying a generally flat strip of uncured tread material about the tread receiving portion and adjacent portions of the side walls of a tire carcass including a first roller means resiliently urging the center portion of the strip into engagement with the tire carcass, a flexible belt having a generally flat or arcuate configuration of relatively large curvature and second roller means for resiliently biasing opposite sides or edges of the belt toward the carcass.

7 Claims, 9 Drawing Figures

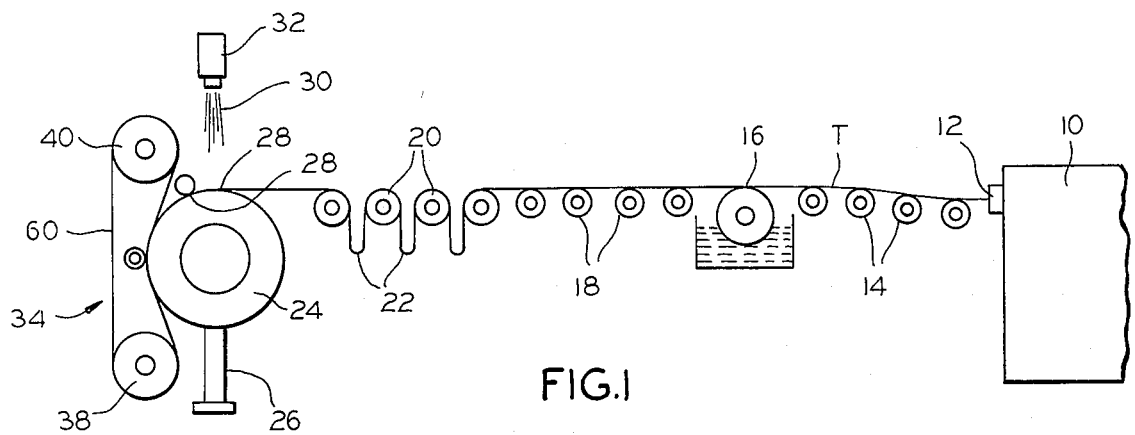
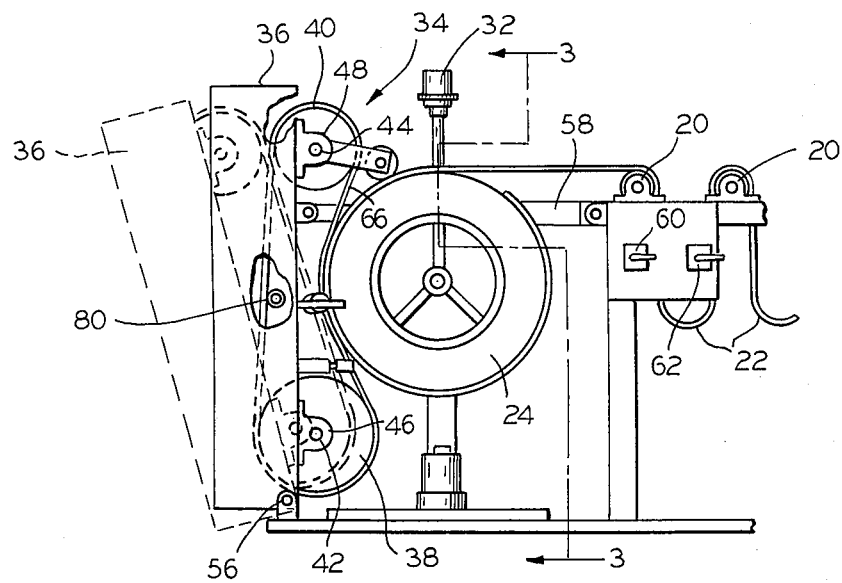
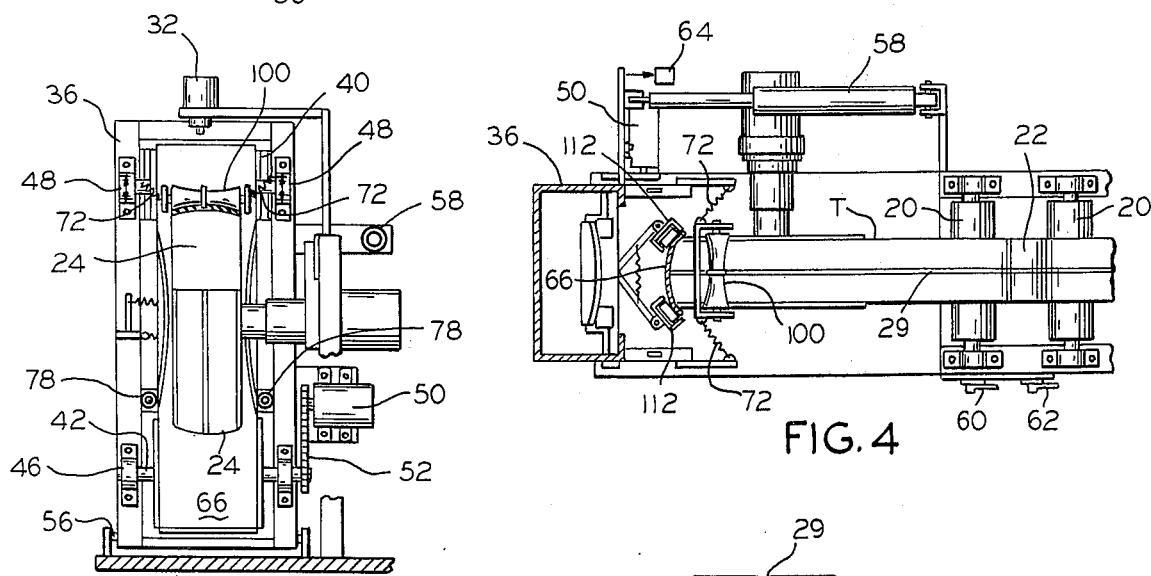
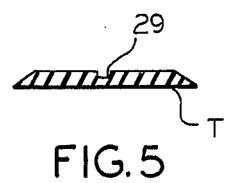
FIG.1
FIG.2
FIG.3
FIG.4
FIG.5

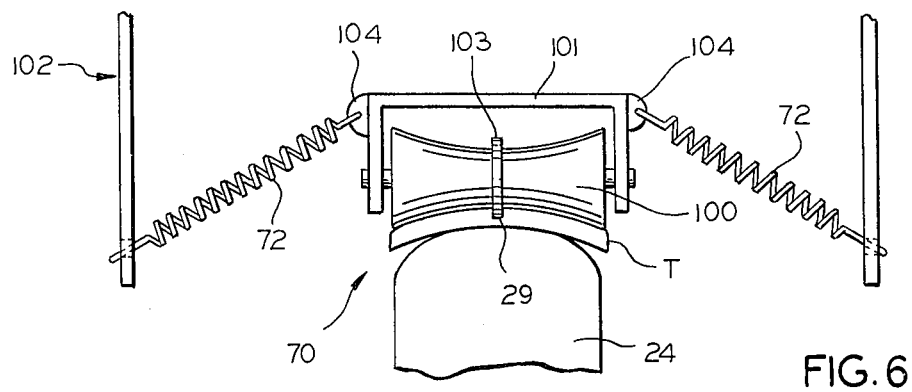
FIG. 6
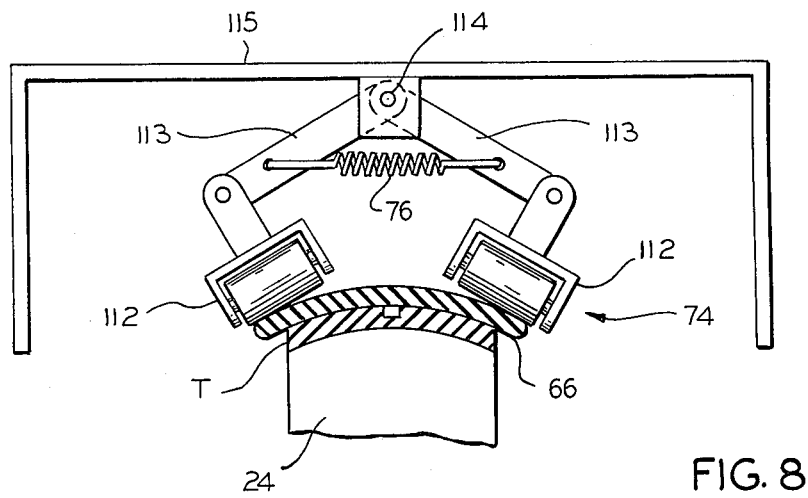
FIG. 8
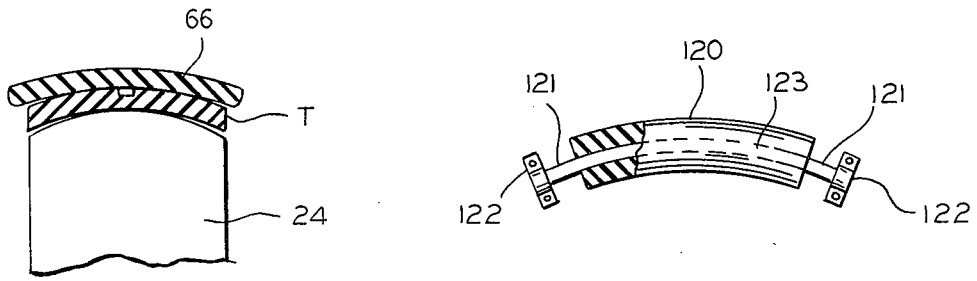
FIG. 7
FIG. 9

TIRE STITCHING APPARATUS

BACKGROUND OF THE INVENTION

Heretofore, various apparatus and methods have been proposed for stitching or securing a strip of rubber tread material to the tread receiving portion and adjacent side wall portions of a tire carcass. However, they have suffered from one or more disadvantages. For example, the production rate has been relatively slow, i.e., approximately 17 to 40 tires per hour. Additionally, the generally flat strip of tread material has been applied in a manner resulting in a wrinkling or puckering of those portions which are applied about the side walls of the carcass and which has also resulted in a decreased thickness in certain portions of the strip. The application of a strip of material to a tire carcass wherein portions of it undergo a certain reduction in thickness is undesirable since, in order to compensate for this reduction, it has been necessary to use a slightly thicker strip of tread material. This increased thickness of the strip has undesirably increased the cost of retreading or recapping tires. The application of the strip to a tire carcass in a manner producing puckering or wrinkling of the portions which are applied about its side walls is disadvantageous also since these portions prematurely split or lose their bond at those points at which the wrinkles have been originally formed, thus adversely affecting the life of a tire, the road engaging portion of which may be only partially expended by wear at the time of side wall failure. Another problem encountered in prior art apparatus and methods has been to maintain the longitudinal axis of a generally flat strip of rubber material coplanar with the center line of the tread portion of the tire carcass. Another disadvantage of the prior art is the inability to prevent the production of recapped or retreaded tires having undesirable light or heavy spots. The existence of such light or heavy spots results in an unbalanced condition when the tire is mounted on a vehicle. Further, the prior art has been disadvantageous due to its poor stitching capabilities and has required the rotation of the tire carcass and its attached strip several complete revolutions in order to effect a barely satisfactory bonding of the strip to the tire carcass. As will be apparent, the time required to rotate the tire carcass the number of revolutions as aforespecified decreased the production rate. Another disadvantage of the prior art was the inability to maintain a predetermined contour or configuration of a strip of material while it was being bonded or stitched to the carcass. Due to the excessive compressive forces applied by the stitcher to the surface of the strip, it was difficult, if not impossible, to retain contours and configurations in their undistorted form in the surface of the strip.

SUMMARY OF THE INVENTION

This invention relates to improved apparatus for stitching a generally flat strip of rubber material about the tread receiving portion and portions of the side walls of a tire carcass. The apparatus includes a first roller for resiliently urging a center portion of the strip material into engagement with the tire, an endless, flexible belt mounted for movement into engagement with the tire and a second roller for resiliently urging the side portions of the belt into engagement with the tire.

BRIEF DESCRIPTION OF THE DRAWINGS

FIG. 1 is a schematic side elevation of a tire treading system;

FIG. 2 is a side elevational view of a tire stitching apparatus according to the invention;

FIG. 3 is a section taken along line 3—3 of FIG. 2, portions being broken away;

FIG. 4 is a top plan view of the apparatus shown in FIG. 1;

FIG. 5 is a section taken on line 5—5 of FIG. 4;

FIG. 6 is a section taken along line 6—6 of FIG. 2;

FIG. 7 is a section taken along line 7—7 of FIG. 2;

FIG. 8 is a section taken along line 8—8 of FIG. 2; and

FIG. 9 illustrates an alternative form of belt pressurizing or stitching roll, and is located on the sheet containing FIG. 1.

DESCRIPTION OF THE PREFERRED EMBODIMENT

FIG. 1 diagrammatically depicts a tire treading apparatus to include a conventional extruder 10 for forcing heated plastic uncured rubber through a die 12 in the form of a generally flat tread strip T which progresses sequentially over guide rolls 14, a cement coating roll 16, drying rolls 18, accumulator rolls 20, the latter being driven at sequentially decreasing speeds, to form a plurality of depending loops 22. A previously prepared cement coated tire carcass 24 is mounted on a fixed support 26 and thence inflated for unpowered free rotation about its axis and to which is applied one end of strip T, starting at a desired point 28. In order to center the strip relative to the central plane of the carcass, the strip may be provided with a central longitudinal groove 29 (FIG. 5) which is aligned with the slit beam 30 of a light projector 32, which is projected onto the central plane of the carcass. The carcass is initially manually rotated as the strip is applied in alignment with the light beam, this operation being rapidly performed since sufficient tread material for the entire tread has been accumulated between the accumulator rolls 20. When point 28 reaches the vicinity of point 28a power driven stitcher 34 is moved into frictional contact with the tire carcass 24 for rotating the same and continuously stitching the strip thereto. When point 28 has moved through approximately one revolution, power to the stitcher 34 is discontinued and the strip is transversely severed to provide a butt joint. Preferably, the plane of severing the strip is slightly beyond where it would match the original and to provide a slight excess of material at the butt joint, which point has been chosen as the lightest point of the carcass as determined from a previous static balance. This excess tread material thus adds some mass to the light point, tending to compensate for the unbalance. After the strip has been severed, power is again applied to the stitcher which stitches the portion between point 28 and the stitching station. When point 28 again moves past the stitching station all points on the tread material have passed once across the stitching station. As illustrated, this requires about one and a quarter revolutions of the carcass since the point 28 at which the end of the strip is initially applied lags the stitching station by about a quarter revolution. The carcass is then deflated, removed from its two-part separable supporting rim and another carcass applied to the rim. The rate of extrusion of the extruder is so adjusted to accumulate the required length of strip for a repeated operation during the time required to dismount the treaded carcass and apply the next one to its rotatable support. As will be apparent at this point, the operation is continuous, with no lost time and the stitching operation occurs by passing any point on the tread material only once across the stitching station. Also, while described in connection with freshly extruded heated rubber it will be apparent that cold rubber may be employed if desired.

Referring now to FIGS. 2, 3 and 4, the stitcher 34 is shown to include an open rigid frame 36 for supporting a pair of spaced rolls 38, 40, carried by shafts 42, 44, the shafts being journaled in pairs of bearings 46, 48, the upper pair 48 being adjustable as indicated by the arrows on same for tensioning a stitcher belt to be subsequently described. The lower shaft 42 is power driven by a motor 50 which may be connected to the shaft in any suitable manner, such as by a chain 52. Since shaft 42 requires a high torque input, motor 50 is preferably of the speed reducing type and also variable speed so that the time required for the stitching operation may be varied as desired.

The lower end of the frame is connected to a base frame or floor 54 by a pivot pin 56 and may swing between the broken and full line positions as shown in FIG. 2. Swinging movement of the frame is effected by a double acting actuator 58 pivotally connected at its ends to the frame and any fixed structure. This is preferably of the pneumatic type rather than hydraulic, and operated from a source of adjustable air pressure, such as a regulator, so that the force exerted by the actuator to the frame may be adjusted as desired. Also, it provides some resilience which would not otherwise be attained by a rigid link, such as a hydraulic actuator. A conveniently located control panel supports a control valve 60 for the actuator and a control 62 for the extruder which may vary its rate of extrusion. Any type of switch 64 may start and stop the stitcher drive motor in response to the pivotal movement of the stitcher frame.

Rolls 38 and 40 support a flexible belt 66, a portion of which engages the tread material and distorts it from its original substantially flat configuration to a curved configuration to conform to the outer surface of the carcass, this operation also expelling air from spaces between the tread material and the carcass. At a first station prior to the engagement of belt 66 with material T, a first roll 70, urged by springs 72, engages the central surface of the strip T and applies a resilient pressure to it, distorting it adjacent its central plane to first stitch this portion of the tread material to the tire carcass 24 at loci adjacent its central plane, as illustrated in FIG. 6. At a subsequent station, as illustrated in FIG. 8, a second set of rolls 74, urged by spring 76, resiliently engage the inner surface of the belt 66 and distort it, moving the outer or wing portions of the tread material T into contact with the corresponding portions of the carcass 24. At an intermediate station, the belt 66 engages the material T (FIG. 7). Only the final stitching at loci opposite the sets of rolls has so far been described. As will now be apparent, however, the change of curvature of the belt 66 cannot take place at a single point opposite the rolls 74, but on the contrary, gradually changes shape at leading and trailing loci, the leading change of shape being more important than the trailing change. The curvature of the belt 66 may thus be best visualized by considering its changing shape as a standing wave or waves with the maximum stitching pressure being applied at the crest of same. This change of curvature at a locus leading rolls 74 thus gradually distorts the tread material T toward the carcass 24, the void space being gradually reduced, expelling air trapped between the carcass 24 and tread material T. Thus, in summary of the sequence of the stitching operation, the tread material T is substantially flat before it is engaged by the rollers 72. Upon engagement by rollers 72, material T is first distorted as shown in FIG. 6. Between this point and that shown in FIG. 7, rolls 74 have distorted the belt into a standing wave which further distorts tread material T, wiping out air adjacent the central plane of the carcass. When the tread material reaches the crest of this wave, opposite rolls 74, the side wall or wing portions of the strip are firmly stitched with like concentrated or localized stitching pressure. As the belt moves past rolls 74 it again resumes its natural curvature before it engages lower drive roll 38, this change again being in the form of a trailing half wave having its crest opposite roll 74. Since pressure is now progressively reducing, the action at this position is of little importance since final stitching of the wing portions has previously occurred.

The stitching belt 66 is preferably endless and without any type of joint so that its flexural characteristics are identical at all cross sections and may be formed of any suitable material such as rubber. Rolls 38 and 40, which support belt 66, are preferably of constant diameter, rather than concave or hour-glass shaped. With such construction and due to the lesser peripheral length of belt 66 at its central plane, as compared with the peripheral lengths at its opposed edges, belt 66 theoretically engages rolls 74 along their central planes with the outer edges of the belt either slightly spaced from rolls 74 or under substantially no tension. This excess of length of the belt at loci spaced from its central plane permits it to be readily distorted to its desired curvature, and particularly adjacent its opposite edges where maximum distortion is required to stitch the wing portions of the tread material.

To maintain belt 66 in proper tracking relation on rolls 38 and 40, idler rolls 78 (FIG. 3) may be provided which engage its opposed edges. Alternatively, rolls 38 and 40 may be provided with flanges (not shown) to properly maintain belt 66 in predetermined relation to the rolls. Other idler rolls 80 (FIG. 2) engageable with the inner surface of belt 66 at its rear or return run may also be provided if found necessary to prevent interference of the rear run with the stitching rolls 74.

Referring now to FIG. 6, the first stitching roll 70 is shown to include a roller 100 journaled for rotation in yoke member 101 resiliently mounted on a generally U-shaped frame member 102 which is affixed to frame 36. More specifically, the yoke 101 may be provided with a pair of ears 104 extending from its opposite sides for receiving one end of springs 72 while the other ends of said springs are received in suitable openings formed in the ends of frame member 102. The surface 106 of roller 100 is generally convex and contoured with a curvature which is slightly greater than that of the tire 24 so that the center portion of the tread material 24 will be pressed into engagement with said tire carcass. An annular projection 103 extends from the center of roller 100 for engaging the groove 29 in material T.

The rolls 74 are each shown in FIG. 8 to be journaled for rotation in a generally U-shaped yoke 112 which in turn are each pivotally connected respectively at one end to arms 113. The other end of arms 113 are pivotally connected at 114 to a generally U-shaped frame member 115 which is suitable secured to the frame 36. A spring 76 is connected intermediate the ends of arms 113 thereby urging the rolls 74 resiliently inwardly toward the tire 24.

In operation, the tread material T will initially be resiliently engaged by roller 100 to press a central portion of the tread material T into engagement with the tire carcass 24 while the outer edges of the material T will remain generally displaced from said tire carcass. As the tire 24 is rotated the tread material will be brought into engagement with the belt 66. Because the belt is distorted by rolls 74 from a generally flat configuration into the configuration of the tire 24, the belt will initially engage the center portion of the tread material T that has been pressed into engagement with the tire 24 by roller 100. As the belt progressively engages greater areas of the tread material T air will be expelled from between said material and the tire 24. Thereafter, the rolls 74 of the second roller assembly 74 resiliently engage the belt 66 at the edges of the tread material T whereby said outer edges are moved into engagement with corresponding portions of the tire 24.

FIG. 9 illustrates an alternative type of stitching roll which differs from paired rolls 70 of FIG. 6 or paired rolls 74 of FIG. 8 in that a single roll 120 is provided which is constructed in the form of a normally right-circular cylinder of resilient matter, such as rubber, which may be distorted to the desired curvature of the belt at the stations illustrated in FIGS. 7 and 8. Suitable pins 121 are embedded in the ends of roll 96 and carry ball bearings 122 which are tensioned in any suitable manner, such as by springs (not shown). Also, the natural resilience of roll 120 may be utilized, if desired, and the bearings connected to fixed structure by chains, such as illustrated in FIG. 4. The roll thus rotates about a curved axis 123 when it is applying pressure to the belt.

Obviously, many modifications and variations of the present invention are possible in the light of the above teachings. It is, therefore, to be understood that within the scope of the appended claims the invention may be practiced otherwise than as specifically described.

I claim:

1. A tire stitching device including means for supporting a tire for rotation about a generally horizontal axis, a support frame mounted adjacent said tire and on one side thereof for pivotal movement between operative and inoperative positions and about an axis generally parallel to the rotational axis of the tire, first and second spaced apart roller means mounted on said support frame for rotation about axes generally parallel to the pivotal axis of said support frame, a resilient endless belt extending around said spaced apart roller means, said belt having a free span between said roller means, said support frame being located relative to said tire such that pivotal movement of said support frame into its operative position being effective to move the free span portion of said endless belt into engagement with the one side of said tire, means for rotating one of said tire and endless belt means, means for delivering a strip of tread material over the upper surface of said tire and from the side thereof opposite to said belt whereby said belt is engageable with said material after passage thereof over the upper end of said tire and to the one side thereof, said belt being wider than said strip material so that the side edges of said belt extend laterally beyond the edges of said strip material, said endless belt having a front face engaging said strip material when said support frame is in its operative position and a back surface which engages said first and second roller means, first support means mounted on said support frame and adjacent the front face of said endless belt and located adjacent the periphery of said tire between the points at which said endless belt and said strip material first engages said tire, first pressure roller means mounted on said first support means for engaging a center portion of said strip material when said support frame is moved into its operative position and for pressing the same into engagement with said tire at a point above a horizontal plane containing the rotational axis thereof and prior to the engagement of said endless belt with said tire, as said tire and strip material is rotated toward said endless belt, means associated with said first pressure roller means for effecting pressure engagement with said strip material, second supporting means mounted on said pivot frame and adjacent the back surface of said belt, second pressure roller means mounted on said second supporting means and engageable with said endless belt when said support frame is in its operative position for forcing the side portions of said belt into engagement with the side portions of said strip material and for pressing said strip material side portions into engagement with said tire.

2. The apparatus set forth in claim 1 wherein said first and second support means each includes spring means for resiliently urging said first and second pressure roller means into engagement with said tire and belt means respectively.

3. The apparatus set forth in claim 2 wherein said second pressure roller means comprises a pair of spaced apart rollers each engaging said endless belt in the area of one of the side portions of said strip material.

4. The apparatus set forth in claim 3 wherein said first pressure roller means comprises a single roller contoured generally to conform to the transverse peripheral configuration of the central area of said tire.

5. The apparatus set forth in claim 4 wherein said second supporting means includes a pair of arm means pivotally mounted at one end about a common axis and each having one of said pair of roller means mounted on an end thereof and spring means interconnecting said arm means intermediate their ends.

6. The apparatus set forth in claim 4 and including guide means formed on said first pressure roller means and constructed and arranged for cooperating with guide means formed on said strip material for guiding and maintaining the center portion of said strip material in alignment with said tire.

7. The apparatus set forth in claim 6 wherein the rotational axes of said first and second roller means is spaced apart a distance greater than the diameter of said tire.

* * * * *